United States Patent [19]

Shimizu

[11] 4,430,180
[45] Feb. 7, 1984

[54] APPARATUS FOR AND METHOD OF ELECTROEROSIVELY DRILLING A THIN HOLE IN A WORKPIECE

[75] Inventor: Akihiko Shimizu, Kawasaki, Japan

[73] Assignee: Japax Incorporated, Kanagawa, Japan

[21] Appl. No.: 312,663

[22] Filed: Oct. 19, 1981

[30] Foreign Application Priority Data

Oct. 21, 1980 [JP] Japan .................................. 55-146356

[51] Int. Cl.$^3$ ........................... B23P 1/02; B23P 1/12; B23K 9/16
[52] U.S. Cl. .............................. 204/129.55; 204/129.7; 204/224 M; 204/225; 219/69 M; 219/69 D; 219/69 E
[58] Field of Search ........... 204/129.55, 129.7, 224 M, 204/225; 219/69 D, 69 E, 69 M

[56] References Cited

U.S. PATENT DOCUMENTS

| Re. 26,531 | 3/1969 | Bender et al. ................ 204/225 X |
| 3,399,125 | 8/1968 | Mikoshiba et al. ............ 204/224 M |
| 3,409,535 | 11/1968 | Ross et al. .................... 204/129.7 X |
| 3,536,599 | 10/1970 | Williams ..................... 204/224 M X |
| 3,773,636 | 11/1973 | Augustin ...................... 204/225 X |

FOREIGN PATENT DOCUMENTS

| 789293 | 1/1958 | United Kingdom . |
| 825291 | 12/1959 | United Kingdom . |
| 1231526 | 5/1971 | United Kingdom . |
| 1363485 | 8/1974 | United Kingdom . |
| 1445133 | 8/1976 | United Kingdom . |
| 2024670 | 1/1980 | United Kingdom . |
| 2074074 | 10/1981 | United Kingdom . |
| 623691 | 9/1978 | U.S.S.R. ........................... 204/129.7 |

Primary Examiner—Donald R. Valentine
Attorney, Agent, or Firm—Karl F. Ross; Herbert Dubno

[57] ABSTRACT

An apparatus for and method of electroerosively drilling a thin hole, e.g. of 1 mm diameter, of a high depth-to-diameter ratio, e.g. 5 or more, in a workpiece with a tubular electrode of corresponding high slenderness. The system utilizes a novel liquid-delivery mechanism which comprises a cylindrical reservoir communicating through an outlet opening thereof with the internal bore of the tubular electrode and hence with the machining gap and a plunger member for operative reception in the reservoir to be movable therein. Prior to a drilling operation, the reservoir is charged via a check valve with a given amount of the machining liquid from a source thereof. During the drilling operation, a motor advances the plunger member to move it within the chamber at a controlled rate. The charged machining liquid in the reservoir chamber is thus pressurized by the plunger member and discharged from and delivered through the internal bore of the tubular electrode into the machining gap at a regulated rate of flow.

16 Claims, 4 Drawing Figures

APPARATUS FOR AND METHOD OF ELECTROEROSIVELY DRILLING A THIN HOLE IN A WORKPIECE

FIELD OF THE INVENTION

The present invention relates to electroerosive drilling in general and, more particularly, to an apparatus for and to a method of electroerosively drilling a thin hole (i.e. of a diameter, say, 1 mm) of a high depth-to-diameter ratio (e.g. 5 or more) in a workpiece with a tubular electrode of high slenderness by passing an electroerosive machining current between the tubular electrode and the workpiece across a machining gap flooded with a machining liquid delivered from a source thereof through the internal bore of the tubular electrode and relatively displacing the tubular electrode and the workpiece being machined to advance the former into the latter to progressively form the desired cavity in the workpiece. The term "electroerosion" is used throughout herein to refer to electrolytic material removal, material removal by the action of electrical discharges or material removal by a combination of the action of electrolytic dissolution and the action of electrical discharges.

BACKGROUND OF THE INVENTION

In the practical process of electroerosive drilling of the type described, it has generally been recognized to have been essential that the machining liquid be supplied to the machining gap from the tubular electrode under elevated pressure and at a regulated high velocity or rate of flow throughout the machining operation.

For example, it has been shown that such a thin hole can be electroerosively drilled at a removal rate as high as 10 to 30 mm/min with a highly slender metallic tubular electrode composed of, say, copper or brass and using as the machining liquid a water liquid having a conductivity of 150 to 250 $\mu$A (or a specific resistance of $5 \times 10^2$ to $10^5$ ohm-cm in general) when the liquid is projected from the tubular electrode under an elevated pressure of, say, 30 kg/cm$^2$ and the machining current is applied to generate a succession of electrical discharges across the machining gap.

For high-speed electroerosive drilling, it has been recognized that the machining current density should be as high as 1000 amperes/cm$^2$ and that the machining gap should be traversed by the machining liquid at a rate as high as 2 to 5 cc/ampere/minute in conjunction with the machining current employed. Such a high-flow rate of the machining liquid should be maintained to assure a prompt removal of machining products from the gap. It has also been recognized that removal of gap products may be promoted by applying an ultrasonic vibration to the flowing machining liquid or to the tool electrode or to both.

As electroerosive material removal proceeds, the tubular electrode needs to be advanced into the workpiece to progressively form the desired hole in the workpiece. To ensure high drilling accuracy, this advance should be effected with smoothness and thus at a constant or regulated rate but this has been recognized to be difficult to achieve with the conventional arrangement.

It has now been found that the difficulty arises mainly because the rate of flow of the machining liquid from the internal bore of the tubular electrode into the machining gap tends to fluctuate in an uncontrolled fashion, especially when it is delivered under an elevated pressure, say, in excess of 20 kg/cm$^2$ to achieve a high drilling speed. Thus, the rate of flow tends to fluctuate due to variations of mechanical precision in machining and finishing the internal bore of the tubular electrode which is as thin as 1 mm diameter and to dimensional variations of the machining end portion of the thin tubular electrode prepared by cutting. Due to these variations, an irregular pressure drop is created in the internal bore of the tubular electrode and tends to cause a fluctuation in the flow rate of the machining liquid into the machining gap. Furthermore, the length of the tubular electrode tends to change due to the wear and erosion of its machining tip portion which may unavoidably occur during machining operations.

The loss of pressure $\Delta P$ within the internal bore of a tubular electrode may, on the assumption that the liquid flow is laminar, be expressed as follows:

$$\Delta P = \frac{128 \, \mu l}{\pi d^4} \times Q = \frac{32 \, \mu l}{d^2} \times v \tag{1}$$

where $\mu$: viscosity constant, Q: the rate of flow of the machining liquid by volume, d: the inner diameter of the tubular electrode, l: the length of the tubular electrode and v: the flow velocity. By substituting certain actual values for d and assuming that v is 1 m/sec, $\Delta P$ and Q can be calculated as shown in Table 1 below.

TABLE 1

| d (mm) | $\Delta P$ (Kg/cm$^2$) | Q (cc/min) |
|---|---|---|
| 0.1 | 64 | 1.8 |
| 0.15 | 29 | 4.2 |
| 0.2 | 16 | 7.2 |
| 0.25 | 10 | 11.4 |

It should be noted in this connection that for example, where the tubular electrode has an inner diameter of 0.15 mm (and an outer diameter of 0.3 mm) and the machining current ranges from 2 to 3 amperes, the water machining liquid must be delivered at a pressure as high as in excess of 40 kg/cm$^2$ to establish a flow rate by volume of 7 to 10 cc/min.

In the conventional liquid delivery arrangement, a pump of delivery pressure of 50 to 100 kg/cm$^2$ has been used and may be driven by a motor of 1 to 2 horsepower. Such a pump of more than enough delivery pressure is required to reduce pulsation to a minimum while allowing excess liquid to be released through a relief valve and the excess energy to be converted into heat. Even with such an arrangement, it has been extremely difficult to maintain the delivery rate of flow of the machining liquid into the machining gap at a desired level prior to or during a given machining operation due to a large pressure drop as referred to above across the thin tubular electrode and due to the aforesaid unavoidable dimensional variations thereof.

OBJECTS OF THE INVENTION

It is accordingly an important object of the present invention to provide an improved electroerosive drilling apparatus and method of the type described which assure drilling of a thin hole with an increased accuracy.

Another object of the invention is to provide an improved electroerosive drilling apparatus and method in which the machining liquid can be delivered at a precisely regulated rate of flow into the machining gap to assure the high-precision drilling of a thin hole in a workpiece.

SUMMARY OF THE INVENTION

In accordance with the present invention there is provided, in a first aspect thereof, an apparatus for electroerosively drilling a thin hole of a high depth-to-diameter ratio in a workpiece with a tubular electrode, which apparatus comprises: power-supply means for passing an electroerosive machining current between the tubular electrode and the workpiece across a machining gap flooded with a machining liquid delivered from a source thereof through the internal bore of the tubular electrode open to the machining gap; first motor means for relatively advancing the tubular electrode axially into the workpiece to progressively form the hole in the workpiece; and a liquid-delivery mechanism comprising: a cylindrical reservoir or chamber communicating through an outlet opening thereof with the internal bore of the tubular electrode; means for charging said chamber with a given amount of the machining liquid from the liquid source; a plunger member for operative reception in the reservoir chamber to be movable therein longitudinally; and second motor means for relatively advancing the reservoir chamber and the plunger member received therein at a controlled rate of relative displacement to pressurize the charged machining liquid in the chamber with the plunger member and to cause it to be discharged out of the chamber through the outlet opening and thereby to be delivered through the internal bore of the tubular electrode into the machining gap at a regulated rate of flow.

Specifically, the reservoir chamber is associated with a tool head for supporting the tubular electrode. The tool head is movable by the first motor means to advance the tubular electrode axially into the workpiece. The plunger member may be adpated to be actually advanced in a direction the same as the direction in which the tool head is advanced, and may be movable within the reservoir chamber by the second motor means provided separately of the aforesaid first motor means. The second motor means may then be arranged to displace the plunger member within the reservoir chamber at a same rate at which the tool head is displaced by the first motor means. Alternatively, the plunger member may itself be arranged to be fixed against movement and the tool head may simply be displaced by the first motor means to advance the tubular electrode into the workpiece. This causes the plunger member to be effectively advanced—in a direction opposite to that in which the tubular electrode advances—within the reservoir chamber as the tool head is displaced. In this case, it will be apparent that the second motor means is constituted by the first motor means.

The invention also provides, in a second aspect thereof, a method of electroerosively drilling a thin hole of a high depth-to-diameter ratio in a workpiece with a tubular electrode of high slenderness, which method comprises the steps of passing an electroerosive machining current between the tubular electrode and the workpiece across a machining gap flooded with a machining liquid; relatively advancing the tubular electrode axially into the workpiece to progressively form the hole in the workpiece; and delivering the machining liquid into the machining gap through the internal bore of the tubular electrode by providing a reservoir chamber communicating through an outlet opening thereof with the internal bore of the tubular electrode; charging the cylindrical chamber with a predetermined amount of the machining liquid from a source thereof; providing a plunger member for operative reception in the reservoir chamber to be movable therein longitudinally; and relatively advancing the reservoir chamber and the plunger member received therein at a controlled rate of relative displacement to pressurize the charged machining liquid in the chamber with the plunger member and to cause it to be progressively discharged out of the chamber through the outlet opening and thereby to be delivered through the internal bore of the tubular electrode into the machining gap at a regulated rate of flow.

The machining liquid charged in the reservoir chamber may be just or slightly in excess of, the amount to be discharged and delivered into the machining gap throughout the course of a given drilling operation. The plunger member and the reservoir chamber may be relatively advanced conveniently at a preset constant rate of relative displacement to allow the machining liquid to be delivered into the machining gap at a correspondingly presettable rate of flow throughout a given drilling operation. More advantageously, the reservoir chamber is associated with a tool head for supporting the tubular electrode and the plunger member may itself be fixed against movement. Then, by simple displacing the tool head to advance the tubular electrode into the workpiece, simultaneously the plunger member can effectively be advanced within the reservoir chamber. Advantageously, the displacement of the tool head can be set at a desired constant rate. The arrangement then automatically assures constancy of the rate of flow of the machining liquid into the machining gap as well.

With the arrangement of the present invention it will be appreciated that the delivery of the machining liquid into the machining gap can be held strictly at a regulated or desired constant rate of flow. Furthermore, the displacement motor can only be driven during an actual drilling operation and since no preliminary driving thereof as in the conventional arrangement is required, a significant increase in energy efficiency is achieved. The displacement motor can also be reduced in capacity.

BRIEF DESCRIPTION OF THE DRAWING

These and other features and advantages of the present invention will be more fully understood from the following description taken with reference to the accompanying drawing in which.

SPECIFIC DESCRIPTION

Figure 1:
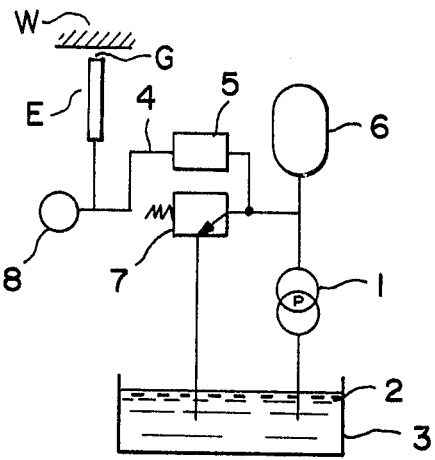
FIG. 1 is a schematic diagram illustrating the conventional liquid-delivery arrangement for performing electroerosive drilling.

Referring now to FIG. 1, in the conventional electroerosive drilling system, a vane pump 1 driven by a motor (not shown) draws a machining liquid 2 from a reservoir 3 and feeds it into the internal bore of a tubular electrode E via a fluid conduit 4 which may include a throttle valve 5. The pump has a delivery pressure typically ranging from 20 to 100 kg/cm² and is driven by a motor of 1 to 2 horse power. To reduce to a minimum pulsation of the machining liquid delivered, the pump 1 should be of a sufficient delivery output and commonly necessitates in its fluid circuits an accumulator 6 and further a relief valve 7 which returns excess liquid to the reservoir 3. A pressure gauge 8 is provided at the outlet side of the throttle value 5.

In spite of provision of the accumulator 6 and the relief valve 6, quite a large pressure loss which develops across the thin tubular electrode E makes it difficult to maintain the rate of flow of the delivered machining liquid during the course of a given drilling operation because dimensional variations of the tubular electrode.

Figure 2:
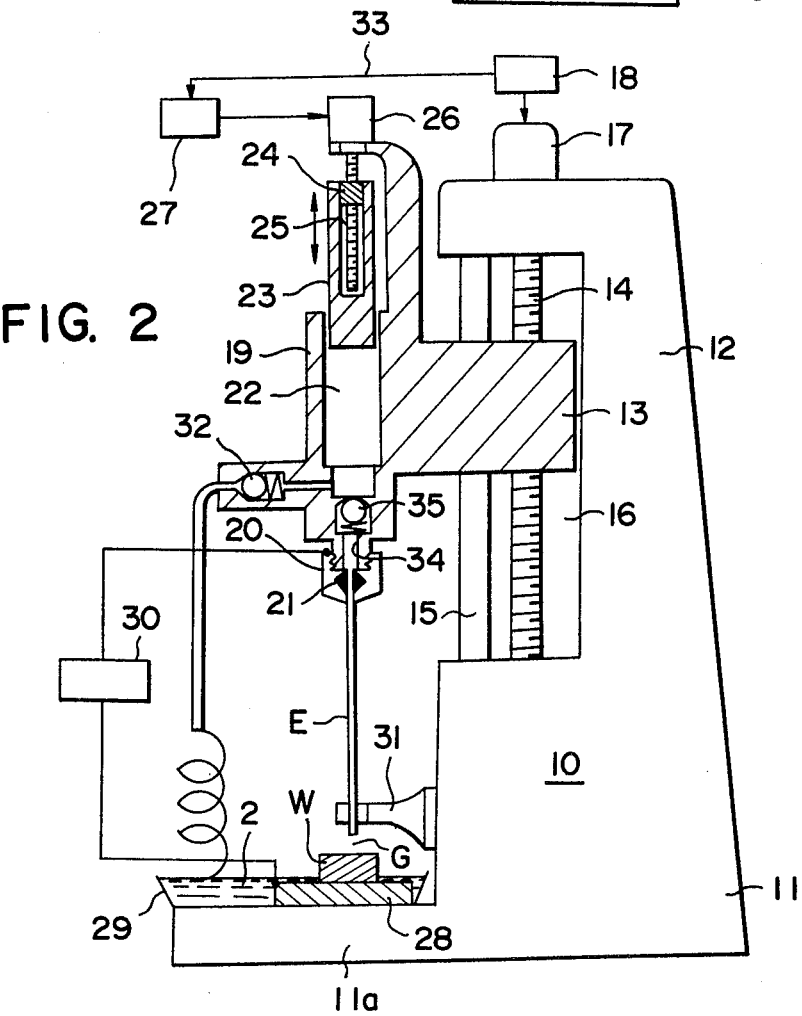
FIG. 2 is an elevational view partly in section diagrammatically illustrating an electroerosive drilling machine incorporating a liquid-delivery system embodying the present invention.

FIG. 2 shows a novel liquid-delivery system embodying the invention used in the electroerosion drilling machine 10 which includes a base 11 and a column 12 standing upright therefrom. A tool head 13 which supports a tubular electrode E is carried on a feed screw 14 so as to move vertically guided on a guide post 15 in a recess 16 of the column 14 as the feed screw 12 is rotationally driven by a motor 17. The motor 17 is advantageously a stepping motor or a DC motor equipped with an encoder and is driven by a driver circuit 18.

Figure 3:
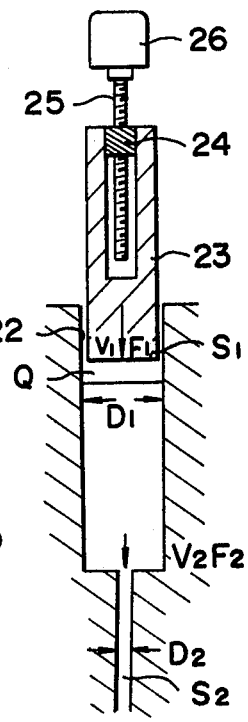
FIG. 3 is an elevational view essentially in section diagrammatically illustrating on an enlaged scale a portion of the arrangement of FIG. 2.

The tool head 13 has a vertically extending horizontal end portion 19 whose lower end has the tubular electrode E detachably secured thereto by means of a chuck 20 and a ring gasket 21. As also shown in FIG. 3, the end portion 19 is also formed with a reservoir chamber 22 into which a plunger member 23 is slidably inserted. The plunger member 23 has a feed nut 24 secured thereto and engaged with a feed screw 25 rotationally driven by a motor 26. The motor 26 is again advantageously a stepping motor or a DC motor equipped with an encoder and is driven by a driver circuit 27. Conveniently, the feed screw 25, plunger member 23 and tubular electrode E are here arranged to be coaxial to one another. The tubular electrode E is axially juxtaposed with a workpiece W securely mounted on a worktable 28 which is, in turn, disposed in a worktank 29 mounted on a horizontal extention 11a of the machine base 11.

A machining power supply 30 has a pair of output terminals which are electrically connected to the tubular electrode E and the workpiece W, respectively, to apply an electroerosive machining current, preferably a succession of pulses, across a machining gap G flooded with a machining liquid 2 delivered from the tubular electrode E under an elevated pressure. The machining liquid is preferably a water liquid having a specific resistance ranging between $5 \times 10^2$ and $10^5$ ohm-cm. An ultrasonic vibrator 31 is also shown provided and arranged to impart a high-frequency vibration to the tubular electrode E transversely to the longitudinal axis thereof to facilitate the electroerosive drilling process.

As drilling proceeds, the driver circuit 18 furnishes the motor 17 with drive signals which cause the tool head to move downwards and in turn the tubular electrode E to move axially downwards at a regulated or desired constant rate of movement progressively into the workpiece W until a desired drilling depth is achieved.

Prior to the drilling operation, the cylindrical chamber 22 is charged with a predetermined amount of the machining liquid 2 from a source thereof via a check valve 32. The machining liquid 2 is shown supplied from the worktank 29 but the source is typically a reservoir tank 3 provided separately of the worktank 29. To allow the chamber 22 to be charged with a predetermined amount of the machining liquid 2, the position of the plunger member 23 is initially ajusted by operating the motor 26 with a positioning signal furnished from the driver circuit 27. At this stage, the tool head 13 has already been positioned by operating the motor 17 with a positioning signal from the driver circuit 18 to place the tip of the tubular electrode E at a position spaced apart from the workpiece W by a predetermined minute distance.

In the actual drilling phase, the plunger member 23 commences moving downwards simultaneously when or immediately before the tool head 13 commences moving downwards to advance the tool electrode E. A timing signal may be applied along a line 33 from the driver circuit 18 to the driver circuit 27. As the plunger member 23 advances axially within the chamber 22, the charged machining liquid therein is pressurized and discharged via an outlet opening 34 and a check valve 35 out of the chamber 22 into the internal bore of the tubular electrode E and in turn into the machining gap G between the tip of the electrode E and the workpiece W. The rate of advance of the plunger member 23 may be adjusted to be equal to or held in proportion to the rate of advance of the tool head 13. To this end, necessary synchronization in signals may be provided along the line 33.

It suffices that the motor 26 operates only during the actual drilling operation. No preliminary driving of the motor 26 is required. This leads to a significant increase in energy efficiency over that of the conventional pumping system in electroerosive drilling. Further, the motor 26 can be of much reduced output. Thus, the invention can be embodied practically. Referring to FIG. 3, assume that the area and diameter of the cylinder chamber 22 are S1 and D1 and the area and diameter of the internal bore of the tubular electrode E are S2 and D2. Then, the force F1 required to drive the plunger member 23 can be given as follows:

$$F1 = \frac{S1 \times F2}{S2} = \frac{D1^2 \times F2}{D2^2} \tag{2}$$

where F2 is the drive force at the electrode bore S2. Then, assuming that D1=4 cm or S1=12.56 cm² and D2=0.030 cm or S2=$7 \times 10^{-4}$ cm² and F2=$2.8 \times 10^{-3}$ Kg/cm² and that the required rate of flow of the machining liquid into the gap is Q=4.2 cc/min, the drive force F1 for the plunger member 23 and its rate of displacement v1 become:

$$F1 = \frac{2.8 \times 10^{-3} \times 12.56}{7 \times 10^{-4}} = 50 \text{ kg} \tag{3}$$

$$v1 = \frac{S2 \times v2}{S1} = \frac{7 \times 10^{-4} \times 1000}{12.56} \tag{4}$$

$$= 5.6 \times 10^{-3} \text{ cm/s} \approx 0.33 \text{ cm/min}.$$

Accordingly, the quantity of work of the plunger becomes $$W = F1 \cdot V1 = 50 \times 5.6 \times 10^{-5} \approx 2.8 \times 10^{-4} \text{ Kg m/s} \tag{5}$$

With the feed screw 25 having a pitch of 1 mm, it is seen that it needs to be rotated only at 3.3 rpm. With the motor 26 being a stepping motor capable of output displacement of 10 μm/pulse, signal pulses need to be applied only at 3300/60=55 pps (pulses per second).

Figure 4:
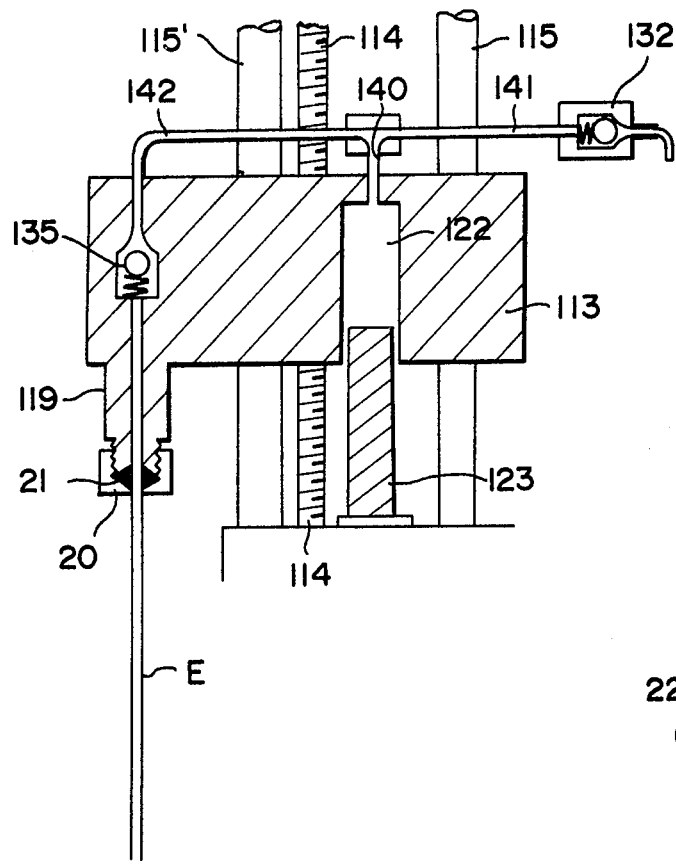
FIG. 4 is an elevational view partly in section diagrammatically illustrating another embodiment of the present invention.

In another form of the invention shown in FIG. 4, the tool head 113 is vertically displaced on a feed screw 114 as the latter is rotationally driven by a motor (not shown) as in the previous embodiment. In this FIGURE, however, a pair of guide posts 115 and 115' are shown which form parallel guide paths for the tool head 113. In this embodiment, the vertically extending plunger member 123 has its lower end secured to a fixed planar member and is thus held against actual displacement. The plunger member 123 has its upper end inserted into the cylindrical reservoir chamber 122 formed in the tool head 113 to be open downwords. The vertical cylindrical chamber 122 is formed at its upper end with an opening 140 into which a pair of conduits 141 and 142 merge. The conduit 141 communicates via a check valve 132 with a source of the machining liquid whereas the conduit 142 again enters the tool head 113 and communicates via a check valve 135 with the internal bore of the tubular electrode E secured to a front projection 119 of the tool head 113 by means of a chuck 20 and a ring gasket 21.

As in the previous embodiment, the cylindrical chamber 122 is charged, prior to a drilling operation, with a predetermined amount of the machining liqid from the source, here via the check valve 132, the conduit 141 and the opening 140 of the chamber 122. The arrangement shown allows the machining liquid to be sucked into the cylindrical chamber 122 by upward movement of the tool head 13. During the drilling operation, downward displacement of the tool head 113 to advance the tubular electrode E progressively into the workpiece causes the chamber 122 to descend, progressively reducing the space thereof defined with the top face of the plunger member 123. This allows the charged machining liquid in the chamber 122 to be pressurized therein and discharged progressively through the opening 140 and the conduit 142 and then through the internal bore of the tubular electrode E into the machining gap. Thus, the rate of flow of the machining liquid into the machining gap is in proportion to the rate of advance of the tool head and hence of the tool electrode E. With the rate of electrode advance set at a desired constant value, the rate of delivery of the machining liquid into the machining gap is strictly held at a correspondingly presettable constant value.

In the foregoing description, it should be understood that the term "cylindrical chamber" is used throughout herein not only to refer to a cylindrical or columnar chamber of circular cross-section but to include such an elongated chamber of any other cross-sectional shape such as ellipse, triangle, square or a polygon. The plunger member should, of course, be of a cross-sectional shape corresponding to that of the "cylindrical chamber."

What is claimed is:

1. An apparatus for electroerosively drilling a thin hole of a high depth-to-diameter ratio in a workpiece with a tubular electrode of corresponding high slenderness, comprising power-supply means for passing an electroerosive machining current between said tubular electrode and said workpiece across a machining gap flooded with a machining liquid delivered from the internal bore of the tubular electrode open to the machining gap;

electrode feed means for relatively advancing said tubular electrode axially into said workpiece to progressively form said hole in the workpiece; and liquid-delivery means comprising:

a reservoir chamber communicating through an outlet opening thereof with said internal bore of the tubular electrode;

means for charging said chamber with a predetermined amount of said machining liquid from a source thereof;

a plunger member for operative reception in said reservoir chamber to be slidably movable therein longitudinally; and displacement means for relatively advancing said reservoir chamber and said plunger member received therein at a controlled rate of relative displacement to pressurize said charged machining liquid in the chamber with the plunger member, such as to cause said liquid to be progressively discharged out of the chamber and to be delivered through said internal bore at a regulated rate of flow to said machining gap.

2. The apparatus defined in claim 1 wherein said electrode feed means includes a tool head for supporting said tubular electrode in spaced juxtaposition with said workpiece and said reservoir chamber is formed in a body constituting a portion of said tool head.

3. The apparatus defined in claim 2 wherein said reservoir chamber includes a plunger receiving opening arranged to permit said plunger member to advance within and relative to said chamber in a same direction as the direction in which said tubular electrode is caused to advance with said tool head into said workpiece.

4. The apparatus defined in claim 3 wherein said plunger member is arranged to be substantially coaxial with said tubular electrode and with said reservoir chamber.

5. The apparatus defined in claim 4 wherein said tool head is carried on a first feed screw to be movable therewith by a first motor and said plunger member is carried on a second feed screw extending substantially in parallel with said first feed screw and arranged to be movable with said second feed screw by a second motor.

6. The apparatus defined in claim 5 wherein said second motor is arranged to advance said plunger member at said rate of displacement in excess of and in proportion to the rate of movement of said tool head by said first motor.

7. The apparatus defined in claim 6 wherein said first and second motors are arranged to be driven at constant rates.

8. The apparatus defined in claim 2 wherein said reservoir chamber includes a plunger receiving opening arranged to permit said plunger member to advance within and relative to said cylindrical chamber in a direction opposite to that in which said tubular electrode is caused to advance with said tool head into said workpiece.

9. The apparatus defined in claim 8 wherein said plunger member is securely held to a fixed member and arranged to extend substantially parallel with said tubular electrode supported by said tool head and substantially coaxial with said chamber.

10. The apparatus defined in claim 9 wherein said tool head is carried on a feed screw to be movable therewith by a motor to advance said tubular electrode into said workpiece in a first direction and simultaneously to advance said plunger member within and relative to said reservoir chamber in a second direction substantially parallel but opposite to said first direction.

11. The apparatus defined in claim 10 wherein said motor is arranged to be driven at a constant rate.

12. A method of electroerosively drilling a thin hole of a high depth-to-diameter ratio in a workpiece with a tubular electrode of corresponding high slenderness, comprising the steps of:

passing an electroerosive machining current between said tubular electrode and said workpiece across a machining gap flooded with a machining liquid delivered from the internal bore of the tubular electrode open to the machining gap;

relatively advancing said tubular electrode axially into said workpiece to progressively form said hole in the workpiece; and delivering said machining liquid into said machining gap by:

providing a reservoir chamber communicating through an outlet opening thereof with said internal bore of the tubular electrode and a plunger member for operative reception in said chamber to be slidably movable therein longitudinally:

charging said chamber with a quantity of said machining liquid from a source thereof; and relatively advancing said chamber and said plunger member received therein at a controlled rate of relative displacement to pressurize said charged machining liquid in the chamber with the plunger member, thereby causing said liquid to be progressively discharged out of the chamber and to be delivered through said internal bore at a regulated rate of flow to said machining gap.

13. The method defined in claim 12, further comprising forming said reservoir chamber in a body constituting a portion of a tool head for supporting said tubular electrode, and displacing said tool head to advance said tubular electrode into said workpiece.

14. The method defined in claim 12, comprising the step of advancing said tubular electrode relatively into said workpiece at a constant rate of advancement.

15. The method defined in claim 12 or claim 14, comprising the step of advancing said plunger member within and relative to said reservoir chamber at said rate of relative displacement which is constant to hold said rate of flow of said machining liquid at a predetermined level.

16. The method defined in claim 12, comprising the step of holding the rate of advance of said plunger member within and relative to said reservoir chamber in proportion to the rate of advance of said tubular electrode into said workpiece.

* * * * *